United States Patent
Brewer et al.

(10) Patent No.: US 12,323,336 B2
(45) Date of Patent: *Jun. 3, 2025

(54) COMBINED WRITE ENABLE MASK AND CREDIT RETURN FIELD

(71) Applicant: Micron Technology, Inc., Boise, ID (US)

(72) Inventors: Tony Brewer, Plano, TX (US); David Patrick, McKinney, TX (US)

(73) Assignee: Micron Technology, Inc., Boise, ID (US)

( * ) Notice: Subject to any disclaimer, the term of this patent is extended or adjusted under 35 U.S.C. 154(b) by 353 days.

This patent is subject to a terminal disclaimer.

(21) Appl. No.: 17/735,636

(22) Filed: May 3, 2022

(65) Prior Publication Data

US 2022/0263769 A1 Aug. 18, 2022

Related U.S. Application Data

(63) Continuation of application No. 17/007,701, filed on Aug. 31, 2020, now Pat. No. 11,356,378.

(51) Int. Cl.
*H04L 47/10* (2022.01)
*H04L 49/90* (2022.01)
*H04L 101/695* (2022.01)

(52) U.S. Cl.
CPC .......... *H04L 47/39* (2013.01); *H04L 49/9026* (2013.01); *H04L 2101/695* (2022.05)

(58) Field of Classification Search
None
See application file for complete search history.

(56) References Cited

U.S. PATENT DOCUMENTS 6,515,963 B1 2/2003 Bechtolsheim et al.
7,042,842 B2 5/2006 Paul et al.
(Continued)

FOREIGN PATENT DOCUMENTS

CN 116235479 A 6/2023
CN 116250218 A 6/2023
(Continued)

OTHER PUBLICATIONS

U.S. Appl. No. 17/007,468, Non Final Office Action mailed Nov. 9, 2021, 11 pgs.
(Continued)

*Primary Examiner* — Derrick W Ferris
*Assistant Examiner* — Keith Follansbee
(74) *Attorney, Agent, or Firm* — Schwegman Lundberg & Woessner, P.A.

(57) ABSTRACT

A credit return field is used in a credit-based flow control system to indicate that one or more credits are being returned to a sending device from a receiving device. Based on the number of credits available, the sending device determines whether to send device or wait until more credits are returned. A write enable mask allows a wide data field to be used even when a smaller amount of data is to be written. A novel data packet uses a combined write enable mask and credit return field. In one mode, the field contains a write enable mask. In another mode, the field contains credit return data. If the field contains credit return data, a default value (e.g., all ones) is used for the write enable mask. The mode may be selected based on another value in the data packet.

20 Claims, 10 Drawing Sheets

(56) References Cited

U.S. PATENT DOCUMENTS

| | | |
|---|---|---|
| 7,103,672 B1 | 9/2006 | Sharma |
| 7,536,473 B2 | 5/2009 | Ajanovic et al. |
| 9,515,961 B2 | 12/2016 | Guo et al. |
| 10,671,554 B1 | 6/2020 | Bharadwaj |
| 11,356,378 B2 | 6/2022 | Brewer et al. |
| 11,362,939 B2 | 6/2022 | Brewer |
| 11,580,044 B2 | 2/2023 | Brewer |
| 11,588,745 B2 | 2/2023 | Pospesel |
| 11,831,543 B2 | 11/2023 | Brewer |
| 11,966,345 B2 | 4/2024 | Brewer |
| 2002/0120808 A1 | 8/2002 | Dyck et al. |
| 2003/0193927 A1 | 10/2003 | Hronik |
| 2005/0047334 A1* | 3/2005 | Paul ............... H04L 49/505 370/229 |
| 2006/0056292 A1 | 3/2006 | Mayhew et al. |
| 2007/0053350 A1 | 3/2007 | Spink et al. |
| 2007/0233918 A1 | 10/2007 | Check et al. |
| 2008/0189504 A1 | 8/2008 | Hughes |
| 2009/0055496 A1 | 2/2009 | Garg et al. |
| 2010/0146162 A1 | 6/2010 | Wagh et al. |
| 2010/0158023 A1 | 6/2010 | Mukhopadhyay et al. |
| 2011/0032947 A1 | 2/2011 | Brueggen |
| 2013/0051397 A1 | 2/2013 | Guo et al. |
| 2014/0112339 A1 | 4/2014 | Safranek et al. |
| 2014/0115208 A1 | 4/2014 | Willey et al. |
| 2015/0109024 A1 | 4/2015 | Abdelfattah et al. |
| 2016/0179427 A1 | 6/2016 | Jen et al. |
| 2016/0188500 A1 | 6/2016 | Morris et al. |
| 2016/0283375 A1 | 9/2016 | Das Sharma et al. |
| 2016/0299699 A1 | 10/2016 | Vanaraj et al. |
| 2017/0026300 A1 | 1/2017 | Rimmer et al. |
| 2017/0063693 A1 | 3/2017 | Kumar et al. |
| 2017/0091108 A1 | 3/2017 | Arellano et al. |
| 2017/0109315 A1 | 4/2017 | Safranek et al. |
| 2017/0116141 A1* | 4/2017 | Mishra ............ G06F 13/102 |
| 2017/0195245 A1 | 7/2017 | Bhatia et al. |
| 2018/0004702 A1 | 1/2018 | Pappu et al. |
| 2018/0011759 A1 | 1/2018 | Willey et al. |
| 2018/0039593 A1 | 2/2018 | Debbage et al. |
| 2018/0188998 A1 | 7/2018 | Shaharabany et al. |
| 2019/0065086 A1 | 2/2019 | Margetts et al. |
| 2019/0243700 A1* | 8/2019 | Brewer ............ H04L 69/18 |
| 2019/0278522 A1 | 9/2019 | Moon et al. |
| 2019/0324928 A1 | 10/2019 | Brewer |
| 2019/0340019 A1 | 11/2019 | Brewer |
| 2019/0340020 A1 | 11/2019 | Brewer |
| 2019/0340023 A1 | 11/2019 | Brewer |
| 2019/0340024 A1 | 11/2019 | Brewer |
| 2019/0340027 A1 | 11/2019 | Brewer |
| 2019/0340035 A1 | 11/2019 | Brewer |
| 2019/0340154 A1 | 11/2019 | Brewer |
| 2019/0340155 A1 | 11/2019 | Brewer |
| 2020/0050398 A1 | 2/2020 | Meyerowitz et al. |
| 2020/0067814 A1 | 2/2020 | Zheng et al. |
| 2020/0081857 A1 | 3/2020 | Barner |
| 2020/0116783 A1 | 4/2020 | Kalva et al. |
| 2020/0183869 A1 | 6/2020 | Mikos |
| 2021/0029062 A1 | 1/2021 | Shan et al. |
| 2021/0117350 A1 | 4/2021 | Safranek et al. |
| 2022/0066967 A1 | 3/2022 | Brewer |
| 2022/0070089 A1 | 3/2022 | Brewer |
| 2022/0070107 A1 | 3/2022 | Pospesel |
| 2022/0070108 A1 | 3/2022 | Brewer et al. |
| 2022/0122668 A1 | 4/2022 | Brewer |
| 2022/0278924 A1 | 9/2022 | Brewer |
| 2023/0118039 A1 | 4/2023 | Brewer |
| 2024/0232111 A1 | 7/2024 | Brewer |

FOREIGN PATENT DOCUMENTS

| | | |
|---|---|---|
| CN | 116261849 A | 6/2023 |
| CN | 116325706 A | 6/2023 |
| WO | WO-2022046252 A1 | 3/2022 |
| WO | WO-2022046253 A1 | 3/2022 |
| WO | WO-2022046254 A1 | 3/2022 |
| WO | WO-2022046255 A1 | 3/2022 |

OTHER PUBLICATIONS

U.S. Appl. No. 17/007,468, Response filed Jan. 7, 2022 to Non Final Office Action mailed Nov. 9, 2021, 10 pgs.
U.S. Appl. No. 17/007,468, Notice of Allowance mailed Feb. 28, 2022, 11 pgs.
U.S. Appl. No. 17/007,516, Non Final Office Action mailed Mar. 1, 2022, 14 pgs.
U.S. Appl. No. 17/007,516, Response filed Apr. 22, 2022 to Non Final Office Action mailed Mar. 1, 2022, 10 pgs.
U.S. Appl. No. 17/007,701, Non Final Office Action mailed Jul. 21, 2021, 6 pgs.
U.S. Appl. No. 17/007,701, Response filed Oct. 21, 2021 to Non Final Office Action mailed Jul. 21, 2021, 8 pgs.
U.S. Appl. No. 17/007,701, Final Office Action mailed Nov. 22, 2021, 5 pgs.
U.S. Appl. No. 17/007,701, Examiner Interview Summary mailed Jan. 13, 2022, 3 pgs.
U.S. Appl. No. 17/007,701, Response filed Jan. 18, 2022 to Final Office Action mailed Nov. 22, 2021, 9 pgs.
U.S. Appl. No. 17/007,701, Notice of Allowance mailed Feb. 8, 2022, 7 pgs.
U.S. Appl. No. 17/007,814, Non Final Office Action mailed Nov. 16, 2021, 12 pgs.
U.S. Appl. No. 17/007,814, Response filed Jan. 12, 2022 to Non Final Office Action mailed Nov. 16, 2021, 11 pgs.
U.S. Appl. No. 17/007,814, Final Office Action mailed Apr. 28, 2022, 13 pgs.
U.S. Appl. No. 17/744,158, filed May 13, 2022, Flow Control for a Multiple Flow Control Unit Interface.
"International Application Serial No. PCT/US2021/038392, International Search Report mailed Oct. 5, 2021", 3 pgs.
"International Application Serial No. PCT/US2021/038392, Written Opinion mailed Oct. 5, 2021", 3 pgs.
"International Application Serial No. PCT/US2021/038401, International Search Report mailed Sep. 17, 2021", 3 pgs.
"International Application Serial No. PCT/US2021/038401, Written Opinion mailed Sep. 17, 2021", 4 pgs.
"International Application Serial No. PCT/US2021/038407, International Search Report mailed Oct. 12, 2021", 4 pgs.
"International Application Serial No. PCT/US2021/038407, Written Opinion mailed Oct. 12, 2021", 5 pgs.
"International Application Serial No. PCT/US2021/038413, International Search Report mailed Oct. 5, 2021", 3 pgs.
"International Application Serial No. PCT/US2021/038413, Written Opinion mailed Oct. 5, 2021", 4 pgs.
U.S. Appl. No. 17/007,516, filed Aug. 31, 2020, Early Credit Return for Credit-Based Flow Control.
U.S. Appl. No. 17/007,701, filed Aug. 31, 2020, Cpmbined Write Enable Mask and Credit Return Field.
U.S. Appl. No. 17/007,468, filed Aug. 31, 2020, Flow Control for a Multiple Flow Control Unit Interface.
U.S. Appl. No. 17/007,814, filed Aug. 31, 2020, Network Credit Return Mechanisms.
U.S. Appl. No. 18/085,274 U.S. Pat. No. 11,966,345, filed Dec. 20, 2022, Network Credit Return Mechanisms.
U.S. Appl. No. 18/610,905, filed Mar. 20, 2024, Network Credit Return Mechanisms.
"International Application Serial No. PCT/US2021/038392, International Preliminary Report on Patentability mailed Mar. 9, 2023", 5 pgs.
"International Application Serial No. PCT/US2021/038401, International Preliminary Report on Patentability mailed Mar. 9, 2023", 6 pgs.
"International Application Serial No. PCT/US2021/038407, International Preliminary Report on Patentability mailed Mar. 9, 2023", 7 pgs.

(56) References Cited

OTHER PUBLICATIONS

"International Application Serial No. PCT/US2021/038413, International Preliminary Report on Patentability mailed Mar. 9, 2023", 6 pgs.

\* cited by examiner

COMBINED WRITE ENABLE MASK AND CREDIT RETURN FIELD

PRIORITY APPLICATION

This application is a continuation of U.S. application Ser. No. 17/007,701, filed Aug. 31, 2020, which is incorporated herein by reference in its entirety.

STATEMENT REGARDING GOVERNMENT SUPPORT

This invention was made with U.S. Government support under Agreement No. HR00111830003, awarded by DARPA. The U.S. Government has certain rights in the invention.

TECHNICAL FIELD

Embodiments of the disclosure relate generally to network protocols and more specifically to networking using a packet structure with a combined write enable mask and credit return field, and more specifically, to a combined write enable mask and credit return field in a system using credit-based flow control, which in selected embodiments may be implemented in packet-based communications in a chiplet system.

BACKGROUND

Various conventional packet-based networking systems utilize a packet structure including a write enable mask. Upon receiving data, the write enable mask is checked to determine which portions of the data should be written and which should be ignored. To return credits, various conventional packet-based networking systems send separate credit-return packets.

Chiplets are an emerging technique for integrating various processing functionalities. Generally, a chiplet system is made up of discrete modules (each a "chiplet") that are integrated on an interposer, and in many examples interconnected as desired through one or more established networks, to provide a system with the desired functionality. The interposer and included chiplets may be packaged together to facilitate interconnection with other components of a larger system. Each chiplet may include one or more individual integrated circuits, or "chips" (ICs), potentially in combination with discrete circuit components, and commonly coupled to a respective substrate to facilitate attachment to the interposer. Most or all chiplets in a system will be individually configured for communication through the one or more established networks.

The configuration of chiplets as individual modules of a system is distinct from such a system being implemented on single chips that contain distinct device blocks (e.g., intellectual property (IP) blocks) on one substrate (e.g., single die), such as a system-on-a-chip (SoC), or multiple discrete packaged devices integrated on a printed circuit board (PCB). In general, chiplets provide better performance (e.g., lower power consumption, reduced latency, etc.) than discrete packaged devices, and chiplets provide greater production benefits than single die chips. These production benefits can include higher yields or reduced development costs and time.

Chiplet systems may include, for example, one or more application (or processor) chiplets and one or more support chiplets. Here, the distinction between application and support chiplets is simply a reference to the likely design scenarios for the chiplet system. Thus, for example, a synthetic vision chiplet system can include, by way of example only, an application chiplet to produce the synthetic vision output along with support chiplets, such as a memory controller chiplet, a sensor interface chiplet, or a communication chiplet. In a typical use case, the synthetic vision designer can design the application chiplet and source the support chiplets from other parties. Thus, the design expenditure (e.g., in terms of time or complexity) is reduced because by avoiding the design and production of functionality embodied in the support chiplets. Chiplets also support the tight integration of IP blocks that can otherwise be difficult, such as those manufactured using different processing technologies or using different feature sizes (or utilizing different contact technologies or spacings). Thus, multiple IC's or IC assemblies, with different physical, electrical, or communication characteristics may be assembled in a modular manner to provide an assembly providing desired functionalities. Chiplet systems can also facilitate adaptation to suit needs of different larger systems into which the chiplet system will be incorporated. In an example, IC's or other assemblies can be optimized for the power, speed, or heat generation for a specific function—as can happen with sensors—can be integrated with other devices more easily than attempting to do so on a single die. Additionally, by reducing the overall size of the die, the yield for chiplets tends to be higher than that of more complex, single die devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1A:
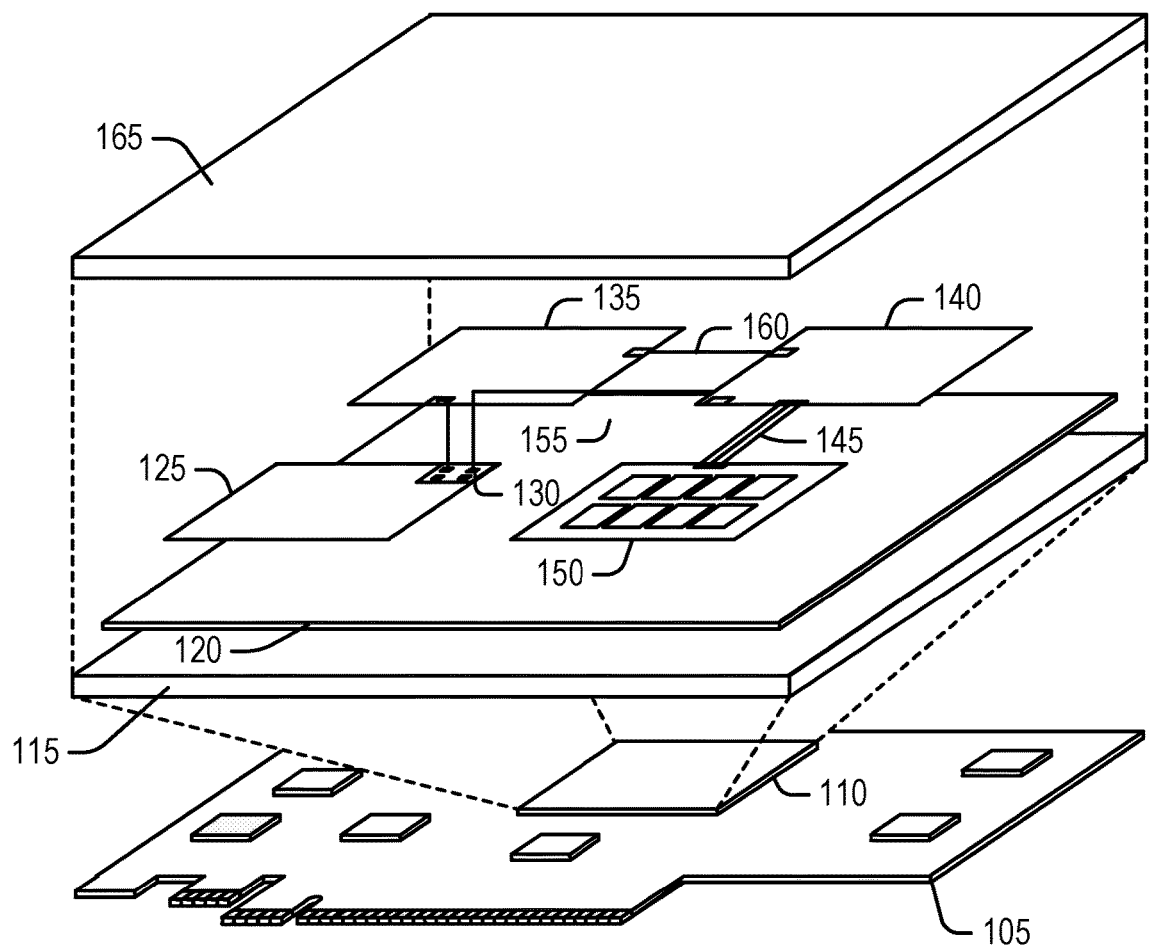
FIGS. 1A and 1B illustrate an example of a chiplet system, according to an embodiment.

Implementations of the present disclosure are directed to systems and methods for creating and processing data packets making use of a combined write enable mask and credit return field. Such discussed system and methods provide efficiencies in the network communications. While such efficiencies may be beneficial in a variety of systems, an example such system that will be discussed herein is a chiplet-based memory system which can be implemented to provide such efficiencies in storing or accessing memory devices at least in part through a packet-based network. A write enable mask allows a first device to send a data packet with a write command and a fixed number of bytes (e.g., four bytes) of data to comply with a transmission protocol without causing the receiving device to write all of the data bytes. The write enable mask is an important feature that allows applications to control data writing at the byte level instead of at a protocol-specific minimum size. However, under many circumstances, the write enable mask simply indicates that all bytes are to be written. For example, when transferring a data file that is much larger than the size of a single data packet, many data packets are sent with the write enable mask fully set.

A credit return field is used in a credit-based flow control system to indicate that one or more credits are being returned to a sending device from a receiving device. Based on the number of credits available, the sending device determines whether to send device or wait until more credits are returned. The credit return field may be a field in a data packet that carries other data (e.g., when two-way communications are used, such as in voice over Internet protocol (VoIP) applications) or may be in a separate credit packet specifically sent for the purpose of returning credits.

A novel data packet uses a combined write enable mask and credit return field. In one mode, the field contains a write enable mask. In another mode, the field contains credit return data. If the field contains credit return data, a default value (e.g., all ones) is used for the write enable mask. The mode may be selected based on another value in the data packet.

Among the benefits of implementations of the present disclosure is that a smaller packet size is supported by comparison with a data packet that includes both a write enable field and a credit return field. Also, a reduction in network traffic is achieved by comparison with a data packet that includes only a write enable field and sends credit return data as separate credit packets. As a result, processing cycles expended in processing network traffic and returning credits are reduced. Additionally, power consumed in processing network traffic and returning credits are reduced. Performance of the system comprising the communicating devices is also improved as a result of the reduced networking overhead. Other benefits will be evident to those of skill in the relevant art having the benefit of this disclosure.

Figure 1B:
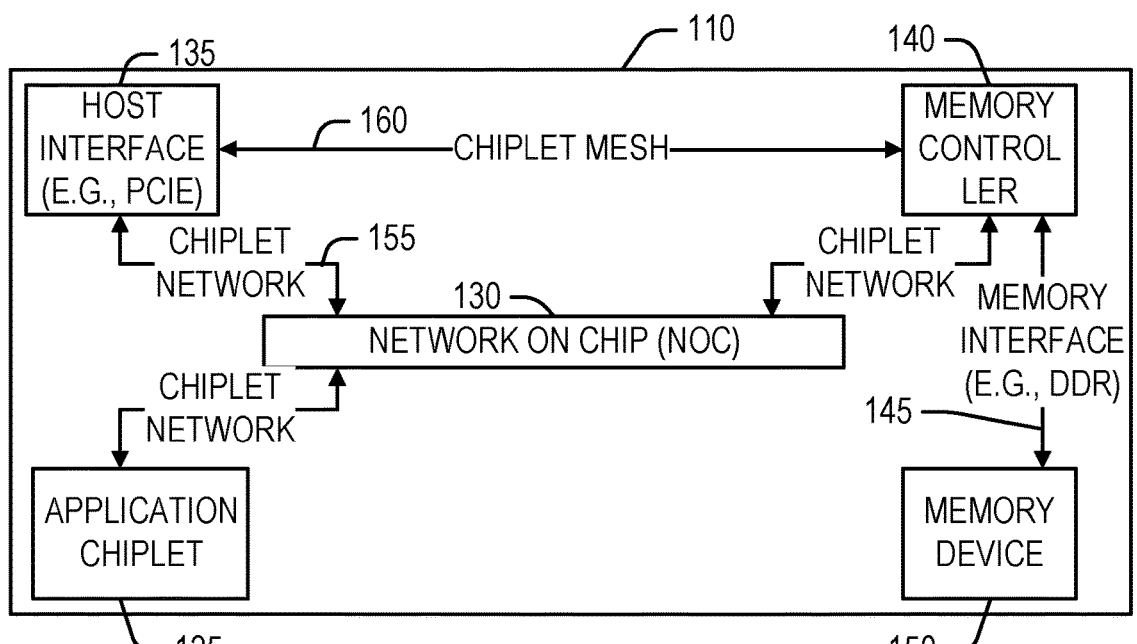

FIGS. 1A and 1B illustrate an example of a chiplet system 110, according to an embodiment. FIG. 1A is a representation of the chiplet system 110 mounted on a peripheral board 105, that can be connected to a broader computer system by a peripheral component interconnect express (PCIe), for example. The chiplet system 110 includes a package substrate 115, an interposer 120, and four chiplets, an application chiplet 125, a host interface chiplet 135, a memory controller chiplet 140, and a memory device chiplet 150. Other systems may include many additional chiplets to provide additional functionalities as will be apparent from the following discussion. The package of the chiplet system 110 is illustrated with a lid or cover 165, though other packaging techniques and structures for the chiplet system can be used. FIG. 1B is a block diagram labeling the components in the chiplet system for clarity.

The application chiplet 125 is illustrated as including a network-on-chip (NOC) 130 to support a chiplet network 155 for inter-chiplet communications. In example embodiments NOC 130 may be included on the application chiplet 125. In an example, NOC 130 may be defined in response to selected support chiplets (e.g., chiplets 135, 140, and 150) thus enabling a designer to select an appropriate number or chiplet network connections or switches for the NOC 130. In an example, the NOC 130 can be located on a separate chiplet, or even within the interposer 120. In examples as discussed herein, the NOC 130 implements a chiplet protocol interface (CPI) network.

The CPI is a packet-based network that supports virtual channels to enable a flexible and high-speed interaction between chiplets. CPI enables bridging from intra-chiplet networks to the chiplet network 155. For example, the Advanced eXtensible Interface (AXI) is a widely used specification to design intra-chip communications. AXI specifications, however, cover a great variety of physical design options, such as the number of physical channels, signal timing, power, etc. Within a single chip, these options are generally selected to meet design goals, such as power consumption, speed, etc. However, to achieve the flexibility of the chiplet system, an adapter, such as CPI, is used to interface between the various AXI design options that can be implemented in the various chiplets. By enabling a physical channel to virtual channel mapping and encapsulating time-based signaling with a packetized protocol, CPI bridges intra-chiplet networks across the chiplet network 155.

CPI can use a variety of different physical layers to transmit packets. The physical layer can include simple conductive connections, or can include drivers to increase the voltage, or otherwise facilitate transmitting the signals over longer distances. An example of one such physical layer can include the Advanced Interface Bus (AIB), which in various examples, can be implemented in the interposer 120. AIB transmits and receives data using source synchronous data transfers with a forwarded clock. Packets are transferred across the AIB at single data rate (SDR) or double data rate (DDR) with respect to the transmitted clock. Various channel widths are supported by AIB. AIB channel widths are in multiples of 20 bits when operated in SDR mode (20, 40, 60, . . . ), and multiples of 40 bits for DDR mode: (40, 80, 120, . . . ). The AIB channel width includes both transmit and receive signals. The channel can be configured to have a symmetrical number of transmit (TX) and receive (RX) input/outputs (I/Os), or have a non-symmetrical number of transmitters and receivers (e.g., either all transmitters or all receivers). The channel can act as an AIB master or slave depending on which chiplet provides the master clock. AIB I/O cells support three clocking modes: asynchronous (i.e. non-clocked), SDR, and DDR. In various examples, the non-clocked mode is used for clocks and some control signals. The SDR mode can use dedicated SDR only I/O cells, or dual use SDR/DDR I/O cells.

In an example, CPI packet protocols (e.g., point-to-point or routable) can use symmetrical receive and transmit I/O cells within an AIB channel. The CPI streaming protocol allows more flexible use of the AIB I/O cells. In an example, an AIB channel for streaming mode can configure the I/O cells as all TX, all RX, or half RX and half RX. CPI packet protocols can use an AIB channel in either SDR or DDR operation modes. In an example, the AIB channel is configured in increments of 80 I/O cells (i.e. 40 TX and 40 RX) for SDR mode and 40 I/O cells for DDR mode. The CPI streaming protocol can use an AIB channel in either SDR or DDR operation modes. Here, in an example, the AIB channel is in increments of 40 I/O cells for both SDR and DDR modes. In an example, each AIB channel is assigned a unique interface identifier. The identifier is used during CPI reset and initialization to determine paired AIB channels across adjacent chiplets. In an example, the interface identifier is a 20-bit value comprising a seven-bit chiplet identifier, a seven-bit column identifier, and a six-bit link identifier. The AIB physical layer transmits the interface identifier using an AIB out-of-band shift register. The 20-bit interface identifier is transferred in both directions across an AIB interface using bits 32-51 of the shift registers.

AIB defines a stacked set of AIB channels as an AIB channel column. An AIB channel column has some number of AIB channels, plus an auxiliary channel. The auxiliary channel contains signals used for AIB initialization. All AIB channels (other than the auxiliary channel) within a column are of the same configuration (e.g., all TX, all RX, or half TX and half RX, as well as having the same number of data I/O signals). In an example, AIB channels are numbered in continuous increasing order starting with the AIB channel adjacent to the AUX channel. The AIB channel adjacent to the AUX is defined to be AIB channel zero.

Generally, CPI interfaces on individual chiplets can include serialization-deserialization (SERDES) hardware. SERDES interconnects work well for scenarios in which high-speed signaling with low signal count are desirable. SERDES, however, can result in additional power consumption and longer latencies for multiplexing and demultiplexing, error detection or correction (e.g., using block level cyclic redundancy checking (CRC)), link-level retry, or forward error correction. However, when low latency or energy consumption is a primary concern for ultra-short reach, chiplet-to-chiplet interconnects, a parallel interface with clock rates that allow data transfer with minimal latency may be utilized. CPI includes elements to minimize both latency and energy consumption in these ultra-short reach chiplet interconnects.

For flow control, CPI employs a credit-based technique. A recipient, such as the application chiplet 125, provides a sender, such as the memory controller chiplet 140, with credits that represent available buffers. In an example, a CPI recipient includes a buffer for each virtual channel for a given time-unit of transmission. Thus, if the CPI recipient supports five messages in time and a single virtual channel, the recipient has five buffers arranged in five rows (e.g., one row for each unit time). If four virtual channels are supported, then the recipient has twenty buffers arranged in five rows. Each buffer holds the payload of one CPI packet.

When the sender transmits to the recipient, the sender decrements the available credits based on the transmission. Once all credits for the recipient are consumed, the sender stops sending packets to the recipient. This ensures that the recipient always has an available buffer to store the transmission.

As the recipient processes received packets and frees buffers, the recipient communicates the available buffer space back to the sender. This credit return can then be used by the sender allow transmitting of additional information.

Also illustrated is a chiplet mesh network 160 that uses a direct, chiplet-to-chiplet technique without the need for the NOC 130. The chiplet mesh network 160 can be implemented in CPI, or another chiplet-to-chiplet protocol. The chiplet mesh network 160 generally enables a pipeline of chiplets where one chiplet serves as the interface to the pipeline while other chiplets in the pipeline interface only with themselves.

Additionally, dedicated device interfaces, such as one or more industry standard memory interfaces 145 (such as, for example, synchronous memory interfaces, such as DDR5, DDR 6), can also be used to interconnect chiplets. Connection of a chiplet system or individual chiplets to external devices (such as a larger system can be through a desired interface (for example, a PCIE interface). Such as external interface may be implemented, in an example, through a host interface chiplet 135, which in the depicted example, provides a PCIE interface external to chiplet system 110. Such dedicated interfaces 145 are generally employed when a convention or standard in the industry has converged on such an interface. The illustrated example of a DDR interface 145 connecting the memory controller chiplet 140 to a dynamic random access memory (DRAM) memory device 150 is just such an industry convention.

Of the variety of possible support chiplets, the memory controller chiplet 140 is likely present in the chiplet system 110 due to the near omnipresent use of storage for computer processing as well as sophisticated state-of-the-art for memory devices. Thus, using memory device chiplets 150 and memory controller chiplets 140 produced by others gives chiplet system designers access to robust products by sophisticated producers. Generally, the memory controller chiplet 140 provides a memory device specific interface to read, write, or erase data. Often, the memory controller chiplet 140 can provide additional features, such as error detection, error correction, maintenance operations, or atomic operation execution. For some types of memory, maintenance operations tend to be specific to the memory device 150, such as garbage collection in NAND flash or storage class memories, temperature adjustments (e.g., cross temperature management) in NAND flash memories. In an example, the maintenance operations can include logical-to-physical (L2P) mapping or management to provide a level of indirection between the physical and logical representation of data. In other types of memory, for example DRAM, some memory operations, such as refresh may be controlled by a host processor or of a memory controller at some times, and at other times controlled by the DRAM memory device, or by logic associated with one or more DRAM devices, such as an interface chip (in an example, a buffer).

Atomic operations are a data manipulation that, for example, may be performed by the memory controller chiplet 140. In other chiplet systems, the atomic operations may be performed by other chiplets. For example, an atomic operation of "increment" can be specified in a command by the application chiplet 125, the command including a memory address and possibly an increment value. Upon receiving the command, the memory controller chiplet 140 retrieves a number from the specified memory address, increments the number by the amount specified in the command, and stores the result. Upon a successful completion, the memory controller chiplet 140 provides an indication of the commands success to the application chiplet 125. Atomic operations avoid transmitting the data across the chiplet network 160, resulting in lower latency execution of such commands.

Atomic operations can be classified as built-in atomics or programmable (e.g., custom) atomics. Built-in atomics are a finite set of operations that are immutably implemented in hardware. Programmable atomics are small programs that can run on a programmable atomic unit (PAU) (e.g., a custom atomic unit (CAU)) of the memory controller chiplet 140. FIG. 1 illustrates an example of a memory controller chiplet that discusses a PAU.

The memory device chiplet 150 can be, or include any combination of, volatile memory devices or non-volatile memories. Examples of volatile memory devices include, but are not limited to, random access memory (RAM)—such as DRAM) synchronous DRAM (SDRAM), graphics double data rate type 6 SDRAM (GDDR6 SDRAM), among others. Examples of non-volatile memory devices include, but are not limited to, negative-and-(NAND)-type flash memory, storage class memory (e.g., phase-change memory or memristor based technologies), ferroelectric RAM (FeRAM), among others. The illustrated example includes the memory device 150 as a chiplet, however, the memory device 150 can reside elsewhere, such as in a different package on the board 105. For many applications, multiple memory device chiplets may be provided. In an example, these memory device chiplets may each implement one or multiple storage technologies. In an example, a memory chiplet may include, multiple stacked memory die of different technologies, for example one or more SRAM devices stacked or otherwise in communication with one or more DRAM devices. Memory controller 140 may also serve to coordinate operations between multiple memory chiplets in chiplet system 110; for example, to utilize one or more memory chiplets in one or more levels of cache storage, and to use one or more additional memory chiplets as main memory. Chiplet system 110 may also include multiple memory controllers 140, as may be used to provide memory control functionality for separate processors, sensors, networks, etc. A chiplet architecture, such as chiplet system 110 offers advantages in allowing adaptation to different memory storage technologies; and different memory interfaces, through updated chiplet configurations, without requiring redesign of the remainder of the system structure.

Figure 2:
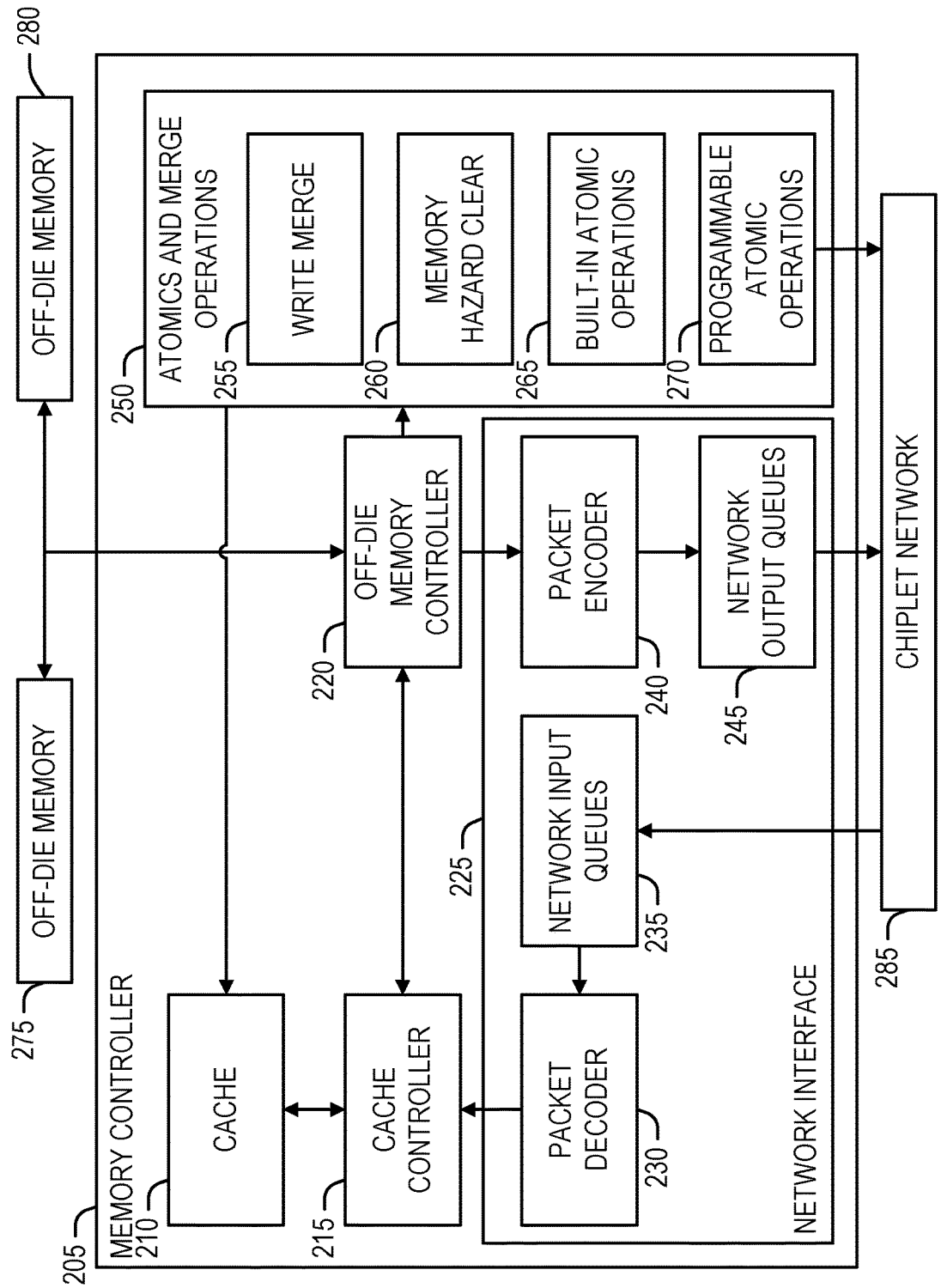
FIG. 2 illustrates components of an example of a memory controller chiplet, according to an embodiment.

FIG. 2 illustrates components of an example of a memory controller chiplet 205, according to an embodiment. The memory controller chiplet 205 includes a cache 210, a cache controller 215, an off-die memory controller 220 (e.g., to communicate with off-die memory 175), a network communication interface 225 (e.g., to interface with a chiplet network 180 and communicate with other chiplets), and a set of atomic and merge operations 250. Members of this set can include, for example, a write merge unit 255, a hazard unit (260), built-in atomic unit 265, or a PAU 270. The various components are illustrated logically, and not as they necessarily would be implemented. For example, the built-in atomic unit 265 likely comprises different devices along a path to the off-die memory. For example, the built-in atomic unit could be in an interface device/buffer on a memory chiplet, as discussed above. In contrast, the programmable atomic operations 270 are likely implemented in a separate processor on the memory controller chiplet 205 (but in various examples may be implemented in other locations, for example on a memory chiplet).

The off-die memory controller 220 is directly coupled to the off-die memory 275 (e.g., via a bus or other communication connection) to provide write operations and read operations to and from the one or more off-die memory, such as off-die memory 275 and off-die memory 280. In the depicted example, the off-die memory controller 220 is also coupled for output to the atomic and merge operations unit 250, and for input to the cache controller 215 (e.g., a memory side cache controller).

In the example configuration, cache controller 215 is directly coupled to the cache 210, and may be coupled to the network communication interface 225 for input (such as incoming read or write requests), and coupled for output to the off-die memory controller 220.

The network communication interface 225 includes a packet decoder 230, network input queues 235, a packet encoder 240, and network output queues 245 to support a packet-based chiplet network 285, such as CPI. The chiplet network 285 can provide packet routing between and among processors, memory controllers, hybrid threading processors, configurable processing circuits, or communication interfaces. In such a packet-based communication system, each packet typically includes destination and source addressing, along with any data payload or instruction. In an example, the chiplet network 285 can be implemented as a collection of crossbar switches having a folded Clos configuration, or a mesh network providing for additional connections, depending upon the configuration.

In various examples, the chiplet network 285 can be part of an asynchronous switching fabric. Here, a data packet can be routed along any of various paths, such that the arrival of any selected data packet at an addressed destination can occur at any of multiple different times, depending upon the routing. Additionally, chiplet network 285 can be implemented at least in part as a synchronous communication network, such as a synchronous mesh communication network. Both configurations of communication networks are contemplated for use for examples in accordance with the present disclosure.

The memory controller chiplet 205 can receive a packet having, for example, a source address, a read request, and a physical address. In response, the off-die memory controller 220 or the cache controller 215 will read the data from the specified physical address (which can be in the off-die memory 275 or in the cache 210), and assemble a response packet to the source address containing the requested data. Similarly, the memory controller chiplet 205 can receive a packet having a source address, a write request, and a physical address. In response, the memory controller chiplet 205 will write the data to the specified physical address (which can be in the cache 210 or in the off-die memories 275 or 280), and assemble a response packet to the source address containing an acknowledgement that the data was stored to a memory.

Thus, the memory controller chiplet 205 can receive read and write requests via the chiplet network 285 and process the requests using the cache controller 215 interfacing with the cache 210, if possible. If the request cannot be handled by the cache controller 215, the off-die memory controller 220 handles the request by communication with the off-die memories 275 or 280, the atomic and merge operations 250, or both. As noted above, one or more levels of cache may also be implemented in off-die memories 275 or 280; and in some such examples may be accessed directly by cache controller 215. Data read by the off-die memory controller 220 can be cached in the cache 210 by the cache controller 215 for later use.

The atomic and merge operations 250 are coupled to receive (as input) the output of the off-die memory controller 220, and to provide output to the cache 210, the network communication interface 225, or directly to the chiplet network 285. The memory hazard clear (reset) unit 260, write merge unit 265 and the built-in (e.g., predetermined) atomic operations unit 265 can each be implemented as state machines with other combinational logic circuitry (such as adders, shifters, comparators, AND gates, OR gates, XOR gates, or any suitable combination thereof) or other logic circuitry. These components can also include one or more registers or buffers to store operand or other data. The PAU 270 can be implemented as one or more processor cores or control circuitry, and various state machines with other combinational logic circuitry or other logic circuitry, and can also include one or more registers, buffers, or memories to store addresses, executable instructions, operand and other data, or can be implemented as a processor.

The write merge unit 255 receives read data and request data, and merges the request data and read data to create a single unit having the read data and the source address to be used in the response or return data packet). The write merge unit 255 provides the merged data to the write port of the cache 210 (or, equivalently, to the cache controller 215 to write to the cache 210). Optionally, the write merge unit 255 provides the merged data to the network communication interface 225 to encode and prepare a response or return data packet for transmission on the chiplet network 280.

When the request data is for a built-in atomic operation, the built-in atomic operations unit 265 receives the request and reads data, either from the write merge unit 265 or directly from the off-die memory controller 220. The atomic operation is performed, and using the write merge unit 255, the resulting data is written to the cache 210, or provided to the network communication interface 225 to encode and prepare a response or return data packet for transmission on the chiplet network 285.

The built-in atomic operations unit 265 handles predefined atomic operations such as fetch-and-increment or compare-and-swap. In an example, these operations perform a simple read-modify-write operation to a single memory location of 32-bytes or less in size. Atomic memory operations are initiated from a request packet transmitted over the chiplet network 285. The request packet has a physical address, atomic operator type, operand size, and optionally up to 32-bytes of data. The atomic operation performs the read-modify-write to a cache memory line of the cache 210, filling the cache memory if necessary. The atomic operator response can be a simple completion response, or a response with up to 32-bytes of data. Example atomic memory operators include fetch-and-AND, fetch-and-OR, fetch-and-XOR, fetch-and-add, fetch-and-subtract, fetch-and-increment, fetch-and-decrement, fetch-and-minimum, fetch-and-maximum, fetch-and-swap, and compare-and-swap. In various example embodiments, 32-bit and 64-bit operations are supported, along with operations on 16 or 32 bytes of data. Methods disclosed herein are also compatible with hardware supporting larger or smaller operations and more or less data.

Built-in atomic operations can also involve requests for a "standard" atomic operation on the requested data, such as comparatively simple, single cycle, integer atomics—such as fetch-and-increment or compare-and-swap—which will occur with the same throughput as a regular memory read or write operation not involving an atomic operation. For these operations, the cache controller 215 may generally reserve a cache line in the cache 210 by setting a hazard bit (in hardware), so that the cache line cannot be read by another process while it is in transition. The data is obtained from either the off-die memory 275 or the cache 210, and is provided to the built-in atomic operation unit 265 to perform the requested atomic operation. Following the atomic operation, in addition to providing the resulting data to the data packet encoder 240 to encode outgoing data packets for transmission on the chiplet network 285, the built-in atomic operation unit 265 provides the resulting data to the write merge unit 255, which will also write the resulting data to the cache circuit 210. Following the writing of the resulting data to the cache 210, any corresponding hazard bit which was set will be cleared by the memory hazard clear unit 260.

The PAU 270 enables high performance (high throughput and low latency) for programmable atomic operations (also referred to as "custom atomic operations"), comparable to the performance of built-in atomic operations. Rather than executing multiple memory accesses, in response to an atomic operation request designating a programmable atomic operation and a memory address, circuitry in the memory controller chiplet 205 transfers the atomic operation request to PAU 270 and sets a hazard bit stored in a memory hazard register corresponding to the memory address of the memory line used in the atomic operation, to ensure that no other operation (read, write, or atomic) is performed on that memory line, which hazard bit is then cleared upon completion of the atomic operation. Additional, direct data paths provided for the PAU 270 executing the programmable atomic operations allow for additional write operations without any limitations imposed by the bandwidth of the communication networks and without increasing any congestion of the communication networks.

The PAU 270 includes a multi-threaded processor, for example, such as a RISC-V ISA based multi-threaded processor, having one or more processor cores, and further having an extended instruction set for executing programmable atomic operations. When provided with the extended instruction set for executing programmable atomic operations, the PAU 270 can be embodied as one or more hybrid threading processors. In some example embodiments, the PAU 270 provides barrel-style, round-robin instantaneous thread switching to maintain a high instruction-per-clock rate.

Programmable atomic operations can be performed by the PAU 270 involving requests for a programmable atomic operation on the requested data. A user can prepare programming code to provide such programmable atomic operations. For example, the programmable atomic operations can be comparatively simple, multi-cycle operations such as floating-point addition, or comparatively complex, multi-instruction operations such as a Bloom filter insert. The programmable atomic operations can be the same as or different than the predetermined atomic operations, insofar as they are defined by the user rather than a system vendor. For these operations, the cache controller 215 can reserve a cache line in the cache 210, by setting a hazard bit (in hardware), so that cache line cannot be read by another process while it is in transition. The data is obtained from either the cache 210 or the off-die memories 275 or 280, and is provided to the PAU 270 to perform the requested programmable atomic operation. Following the atomic operation, the PAU 270 will provide the resulting data to the network communication interface 225 to directly encode outgoing data packets having the resulting data for transmission on the chiplet network 285. In addition, the PAU 270 will provide the resulting data to the cache controller 215, which will also write the resulting data to the cache 210. Following the writing of the resulting data to the cache 210, any corresponding hazard bit which was set will be cleared by the cache control circuit 215.

In selected examples, the approach taken for programmable atomic operations is to provide multiple, generic, custom atomic request types that can be sent through the chiplet network 285 to the memory controller chiplet 205 from an originating source such as a processor or other system component. The cache controllers 215 or off-die memory controller 220 identify the request as a custom atomic and forward the request to the PAU 270. In a representative embodiment, the PAU 270: (1) is a programmable processing element capable of efficiently performing a user defined atomic operation; (2) can perform load and stores to memory, arithmetic and logical operations and control flow decisions; and (3) leverages the RISC-V ISA with a set of new, specialized instructions to facilitate interacting with such controllers 215, 220 to atomically perform the user-defined operation. In desirable examples, the RISC-V ISA contains a full set of instructions that support high level language operators and data types. The PAU 270 can leverage the RISC-V ISA, but will commonly support a more limited set of instructions and limited register file size to reduce the die size of the unit when included within the memory controller chiplet 205.

As mentioned above, prior to the writing of the read data to the cache 210, the set hazard bit for the reserved cache line is to be cleared, by the memory hazard clear unit 260. Accordingly, when the request and read data is received by the write merge unit 255, a reset or clear signal can be transmitted by the memory hazard clear unit 260 to the cache 210 to reset the set memory hazard bit for the reserved cache line. Also, resetting this hazard bit will also release a pending read or write request involving the designated (or reserved) cache line, providing the pending read or write request to an inbound request multiplexer for selection and processing.

Figure 3:
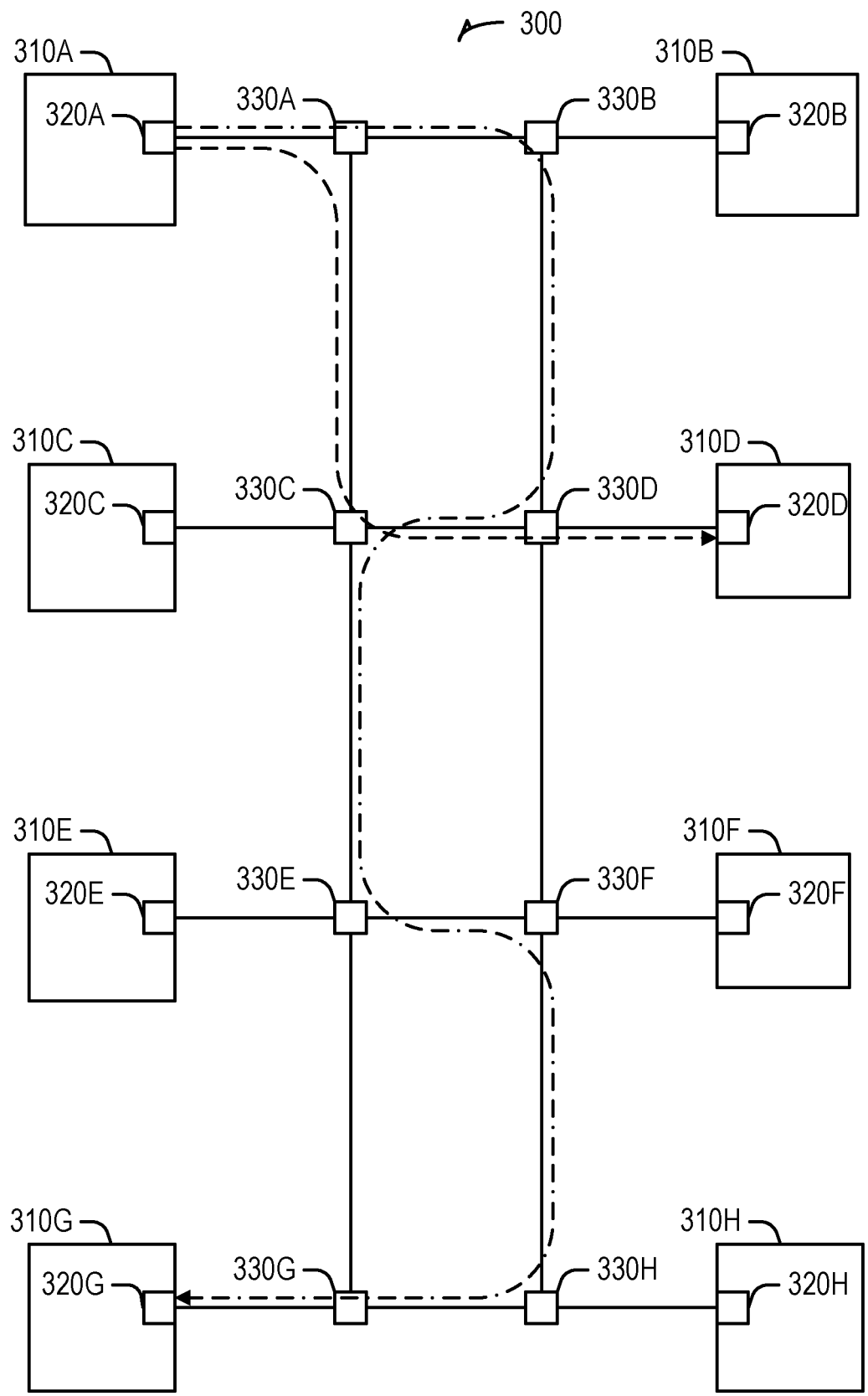
FIG. 3 illustrates an example of routing between chiplets in a chiplet layout using a chiplet protocol interface (CPI) network, according to an embodiment.

FIG. 3 illustrates an example of routing between chiplets in a chiplet layout 300 using a chiplet protocol interface (CPI) network, according to an embodiment. The chiplet layout 300 includes chiplets 310A, 310B, 310C, 310D, 310E, 310F, 310G, and 310H. The chiplets 310A-310H are interconnected by a network comprising nodes 330A, 330B, 330C, 330D, 330E, 330F, 330G, and 330H. Each of the chiplets 310A-310H includes a hardware transceiver, labeled 320A-320H.

CPI packets can be transferred between the chiplets 310 using an Advanced Interface Bus (AIB). The AIB provides physical layer functionality. The physical layer transmits and receives data using source synchronous data transfers with a forwarded clock. Packets are transferred across the AIB at SDR or DDR with respect to the transmitted clock. Various channel widths are supported by the AIB. AIB channel widths are in multiples of 20 bits when operated in SDR mode (20, 40, 60, . . . ), and 40 bits for DDR mode: (40, 80, 120, . . . ). The AIB channel width includes both transmit and receive signals. The channel may be configured to have a symmetrical number of transmit (TX) and receive (RX) input/outputs (I/Os), or have a non-symmetrical number of transmitters and receivers (e.g., either all transmitters or all receivers). The channel may act as an AIB master or slave depending on which chiplet provides the master clock.

The AIB adapter provides an interface to the AIB link layer and an interface to the AIB physical layer (PHY). The AIB adapter provides data staging registers, power-on reset sequencers, and a control signal shift register.

The AIB physical layer consists of AIB I/O Cells. AIB I/O cells (implemented, in some example embodiments, by the hardware transceivers 320) may be input only, output only or bidirectional. An AIB channel is composed of a set of AIB I/O cells, the number of cells is dependent on the configuration of the AIB channel. The receive signals on one chiplet are connected to the transmit signals on the paired chiplet. In some example embodiments, each column comprises an auxiliary (AUX) channel and data channels numbered 0 to N.

AIB channels are typically configured as half TX data plus half RX data, all TX data, or all RX data plus associated clocks and miscellaneous control. The number of TX versus RX data signals is determined at design time and cannot be configured as part of system initialization, in some example embodiments.

The CPI packet protocols (point-to-point and routable) use symmetrical receive and transmit I/O cells within an AIB channel. The CPI streaming protocol allows more flexible use of the AIB I/O cells. An AIB channel for streaming mode may configure the I/O cells as all TX, all RX, or half RX and half RX, in some example embodiments.

Data packets are routed among the chiplets 310 by the network nodes 330. A node 330 may determine the next node 330 to forward a received data packet to based on one or more data fields of the data packet. For example, a source or destination address, source or destination port, virtual channel, or any suitable combination thereof may be hashed to select a successive network node or an available network path. Selecting paths in this way may serve to balance network traffic.

Thus, in FIG. 3, a data path is shown from the chiplet 310A to the chiplet 310D. The data packet is sent by the hardware transceiver 320A to the network node 330A; forwarded by the network node 330A to the network node 330C; forwarded by the network node 330C to the network node 330D; and delivered by the network node 330D to the hardware transceiver 320D of the chiplet 310D.

A second data path is also shown in FIG. 3, from the chiplet 310A to the chiplet 310G. The data packet is sent by the hardware transceiver 320A to the network node 330A; forwarded by the network node 330A to the network node 330B; forwarded by the network node 330B to the network node 330D; forwarded by the network node 330D to the network node 330C; forwarded by the network node 330C to the network node 330E; forwarded by the network node 330E to the network node 330F; forwarded by the network node 330F to the network node 330H; forwarded by the network node 330H to the network node 330G; and delivered by the network node 330G to the hardware transceiver 320G of the chiplet 310G. As is visually apparent in FIG. 3, multiple paths through the network are available for transmission of data between any pair of chiplets.

AIB I/O cells support three clocking modes: asynchronous (i.e. non-clocked), SDR, and DDR. The non-clocked mode is used for clocks and some control signals. The SDR mode may use dedicated SDR only I/O cells, or dual use SDR/DDR I/O cells.

CPI packet protocols (point-to-point and routable) may use an AIB channel in either SDR or DDR operation modes. In some example embodiments, the AIB channel shall be is in increments of 80 I/O cells (i.e. 40 TX and 40 RX) for SDR mode and 40 I/O cells for DDR mode.

CPI streaming protocol may use an AIB channel in either SDR or DDR operation modes. In some example embodiments, for both modes (SDR and DDR) the AIB channel is in increments of 40 I/O cells.

Each AIB channel is assigned a unique interface identifier. The identifier is used during CPI reset and initialization to determine paired AIB channels across adjacent chiplets. In some example embodiments, the interface identifier is a 20-bit value comprising a seven-bit chiplet identifier, a seven-bit column identifier, and a six-bit link identifier. The AIB physical layer transmits the interface identifier using an AIB out-of-band shift register. The 20-bit interface identifier is transferred in both directions across an AIB interface using bits 32-51 of the shift registers.

AIB defines a stacked set of AIB channels as an AIB channel column. As shown in FIG. 3, an AIB channel column has some number of AIB channels, plus an auxiliary channel. The auxiliary channel contains signals used for AIB initialization. All AIB channels (other than the auxiliary channel) within a column are of the same configuration (e.g., all TX, all RX, or half TX and half RX, as well as having the same number of data I/O signals). The AIB channel columns are arranged around the periphery of a chiplet in a specific orientation to allow interoperability between chiplets. Though each of the chiplets 310 is shown in FIG. 3 with one hardware transceiver 320, note that each side of a chiplet may have zero or more hardware transceivers.

In some example embodiments, AIB channels are numbered in continuous increasing order starting with the AIB channel adjacent to the AUX channel. The AIB channel adjacent to the AUX is defined to be AIB channel zero.

FIG. 3, by way of example, shows eight chiplets 310 connected by a network comprising eight nodes 330. More or fewer chiplets 310 and more or fewer nodes 330 may be included in the chiplet network, allowing a network of chiplets of arbitrary size to be created.

Figure 4:
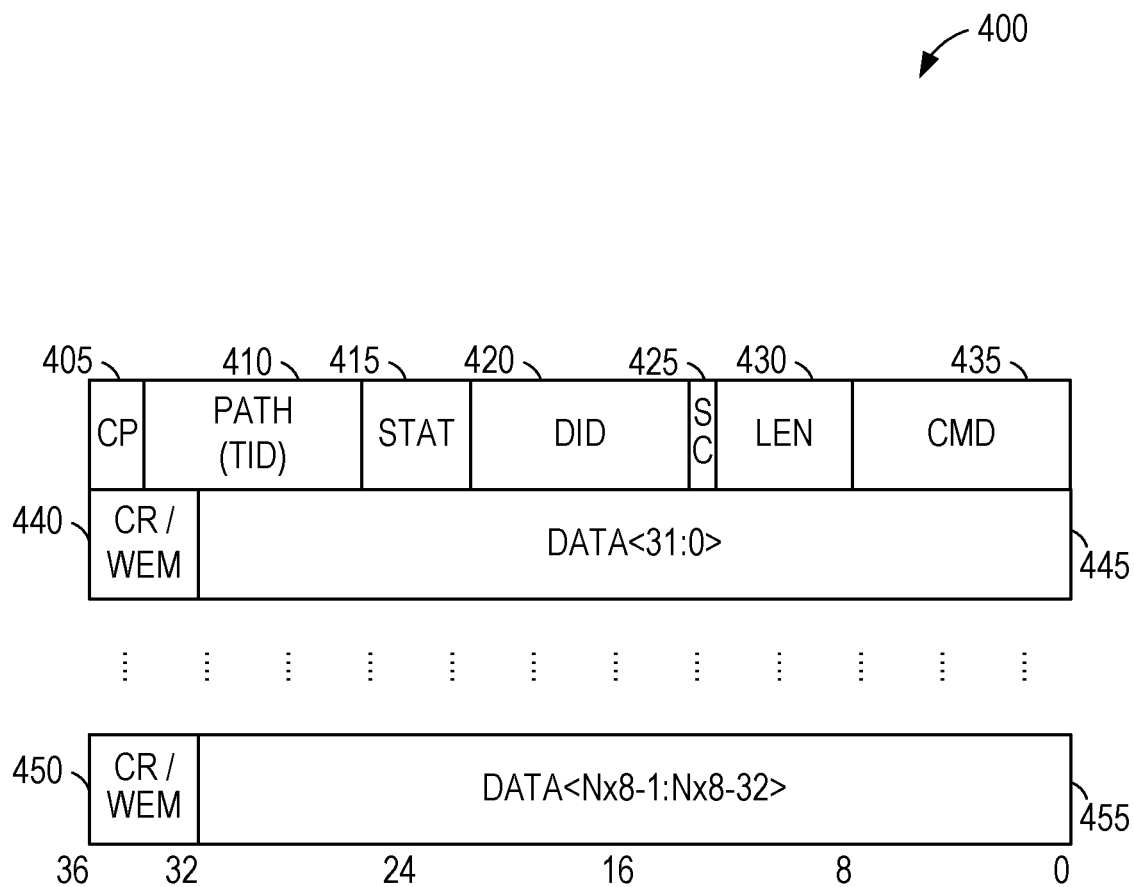
FIG. 4 is a block diagram of a data packet comprising a combined write enable mask and credit return field, in accordance with some embodiments of the present disclosure.

FIG. 4 is a block diagram of a data packet 400 comprising a combined write enable mask and credit return field, in accordance with some embodiments of the present disclosure. The data packet 400 is divided into flow control units (flits), each of which is composed of 36 bits. The first flit of the data packet 400 includes CP field 405, path field 410, stat field 415, destination identifier (DID) field 420, sequence continue (SC) field 425, length field 430, and command field 435. Each remaining flit includes a credit return (CR)/write enable mask (WEM) field (e.g., the CR/WEM fields 440 and 450) and a data field (e.g., the data fields 445 and 455). Example field sizes are discussed below as an illustrative example; though the field sizes may be different for selected applications, and are not limiting on the characteristics of the data packets.

The CP field 405 is a two-bit field that indicates whether the CR/WEM field of later flits in the packet contain CR data, WEM data, or should be ignored, and whether the path field 410 should be used to control ordering of packets. In some example embodiments, a value of 0 or 1 in the CP field 405 indicates that the CR/WEM fields 440, 450 contain credit return data; a value of 2 or 3 in the CP field 405 indicates that the CR/WEM fields 440, 450 contain WEM data; a value of 0 indicates that the path field 410 is ignored; a value of 1 or 3 indicates that the path field 410 is used to determine the path for the data packet 400; and a value of 2 indicates that single path ordering is to be used. In some example embodiments a 1-bit field is used. Alternatively, the high bit of the CP field 405 may be considered to be a 1-bit field that controls whether the CR/WEM fields 440, 450 contain credit return data or WEM data. In some example embodiments, the 1-bit field that controls the interpretation of a field is part of the controlled field. For example, by extending the CR/WEM field 440, 450 by one bit to include the selection bit, the CR/WEM field 440, 450 may be made self-controlling.

The path field 410 is an eight-bit field. When the CP field 405 indicates that the path field 410 is used to determine the path for a data packet 400, all data packets having the same value for the path field 410 are guaranteed to take the same path through the network. As a result, the order of the data packets will be unchanged between the sender and the receiver. If the CP field 405 indicates that single path ordering is to be used, the path is determined for each packet as though the path field 410 were set to zero. Accordingly, all packets take the same path and the order will be unchanged, regardless of the actual value of the path field 410 of each data packet. If the CP field 405 indicates that the path field 410 is to be ignored, the data packets are routed without regard to the value of the path field 410 and the data packets may be received by the receiver in a different order than they were sent by the sender. However, this may avoid congestion in the network and allow for greater throughput in the device.

The response status is stored in the stat field 415, a four-bit field. In some example embodiments, a status of zero indicates that a request was successfully handled, one indicates an address error, two indicates an unsupported request, three indicates an uncorrectable data error, and values of four through fifteen are reserved.

The DID field 420 stores a twelve-bit DID. The DID uniquely identifies a destination in the network (e.g., a destination chiplet). A sequence of data packets all having the 1-bit SC field 425 set are guaranteed to be delivered in order. The length field 430 is a five-bit field that indicates the number of flits that comprise the data packet 400. Interpretation of the length field 430 may be non-linear. For example, values 0-22 may be interpreted as 0-22 flits in the data packet 400 and values 23-27 may be interpreted as 33-37 flits in the data packet 400 (i.e., 10 more than the indicated value). Other values of the length field 430 may be vendor defined instead of protocol defined.

The command for the data packet 400 is stored in the command field 435, a seven-bit field. The command may be a write command, a read command, a predefined atomic operation command, a custom atomic operation command, a read response, an acknowledge response, or a vendor-specific command. Additionally, the command may indicate a virtual channel of the data packet 400. For example, different commands may be used for different virtual channels or 1, 2, 3, or 4 bits of the seven-bit command field 435 may be used to indicate the virtual channel and the remaining bits may be used to indicate the command.

The memory access commands may further identify a number of bytes to be written or accessed, a memory space to access (e.g., the off-die memory 375 or an instruction memory for custom atomic operations), or any suitable combination thereof. In some example embodiments, the command may indicate that additional bits of a later flit identify the command. For example, a multi-byte command could be sent by using a vendor-specific command in the seven-bit command field 435 and using a portion or all of the 32-bit data field 445 to contain the larger command.

If WEM is enabled, the CR/WEM field 440, 450 is a four-bit mask that indicates if each of the corresponding bytes of the 32 bits of data in the flit is to be written. Thus, a single flit is always 36 bits in size, but may contain 0-32 bits of data to be written. If CR is enabled, two bits of the CR/WEM field 440, 450 identify whether the credit return is for virtual channel 0, 1, 2, or 3 and the other two bits of the CR/WEM field 440, 450 indicate whether the number of credits to be returned is 0, 1, 2, or 3.

Figure 5:
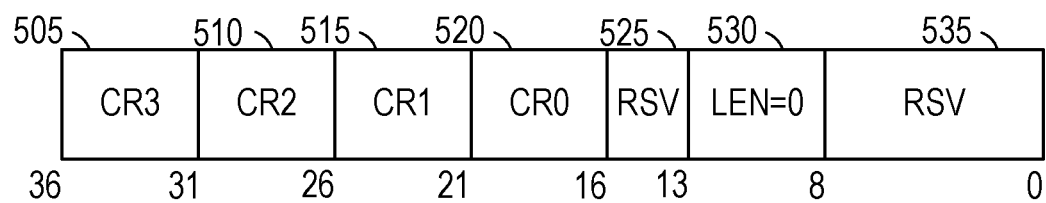
FIG. 5 is a block diagram of a credit packet suitable for use in a system using credit-based flow control, in accordance with some embodiments of the present disclosure.

FIG. 5 is a block diagram of a credit packet 500 suitable for use in a system using credit-based flow control, in accordance with some embodiments of the present disclosure. The credit packet 500 comprises a single 36-bit flit. The flit includes four credit return fields 505, 510, 515, and 520, a length field 530, and reserved fields 525 and 535. The length field 530 is set to zero, to indicate that no additional flits make up the credit packet 500. The reserved fields 525 and 535 are not used and should be set to zero.

Each of the credit return fields 505-520 is a five-bit field. The first bit of a credit return field 505-520 is set to zero if the credits are being returned to a low virtual channel. The first bit of a credit return field 505-520 is set to one if the credits are being returned to a high virtual channel. The remaining four bits of each credit return field 505-520 indicate the number of credits (0-15) being returned. Thus, the CR0 credit return field 520 returns 0-15 credits to virtual channel 0 or 4; the CR1 credit return field 515 returns 0-15 credits to virtual channel 1 or 5; the CR2 credit return field 510 returns 0-15 credits to virtual channel 2 or 6; and the CR3 credit return field 505 returns 0-15 credits to virtual channel 3 or 7.

Thus, credit return for credit-based flow control can be implemented by using the CR/WEM field 440, 450 of the data packet 400 when sending other data packets, such as acknowledgement packets or by using the data packet 500. In systems using credit-based flow control that do not support a combined write enable mask and credit return field, either the data packet 400 must be modified to include an additional credit return field or additional network packets, such as the credit packet 500, must be sent to return the credits.

Figure 6:
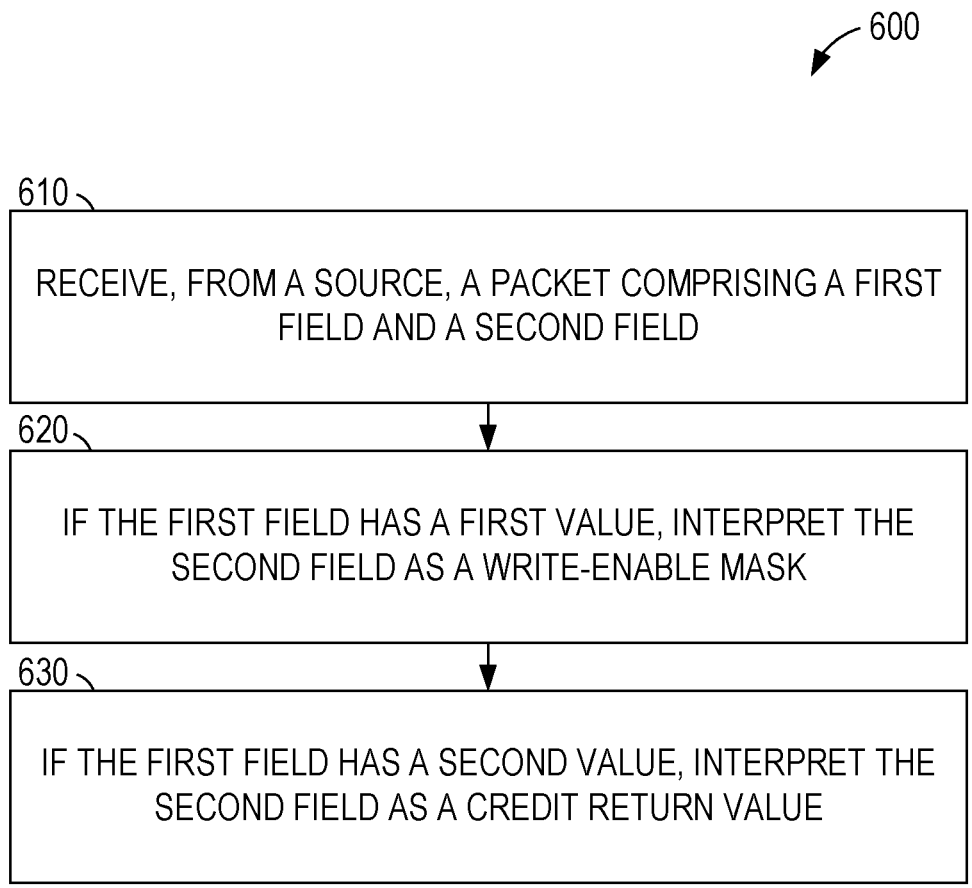
FIG. 6 is a flow chart showing operations of a method performed by a circuit in processing a data packet making use of a combined write enable mask and credit return field, in accordance with some embodiments of the present disclosure.

FIG. 6 is a flow chart showing operations of a method 600 performed by a circuit in processing a data packet making use of a combined write enable mask and credit return field, in accordance with some embodiments of the present disclosure. The method 600 includes operations 610, 620, and 630. By way of example and not limitation, the method 600 is described as being performed by the devices of FIGS. 1-3, using the packets of FIGS. 4-5.

In operation 610, a circuit (e.g., the chiplet 210D) receives, from a source (e.g., the chiplet 210A), a packet comprising a first field and a second field. In some example embodiments, the packet is the data packet 400, the first field is the CP field 405, and the second field is the CR/WEM field 440.

The circuit, in operation 620, if the first field has a first value, interprets the second field as a write-enable mask. For example, the chiplet 210A may send a data packet 400 in which the CP field 405 includes a 1-bit that indicates that the CR/WEM field 440 is a WEM. The WEM indicates that some of the data field 445 is to be written to memory, but some of the data field 445 is to be discarded.

In operation 630, if the first field has a second value, interprets the second field as a credit return value. For example, the chiplet 210A may send a data packet 400 in which the CP field 405 includes a 0-bit that indicates that the CR/WEM field 440 contains a credit return value. Accordingly, the chiplet 210D receiving the packet increments the available credits for the virtual channel on which the packet was sent, as indicated by the value in the command field 435. In some example embodiments, multiple CR/WEM fields 440, 450 are present and, based on the first field having the second value, each of the multiple CR/WEM fields 440, 450 are interpreted as credit return values.

Figure 7:
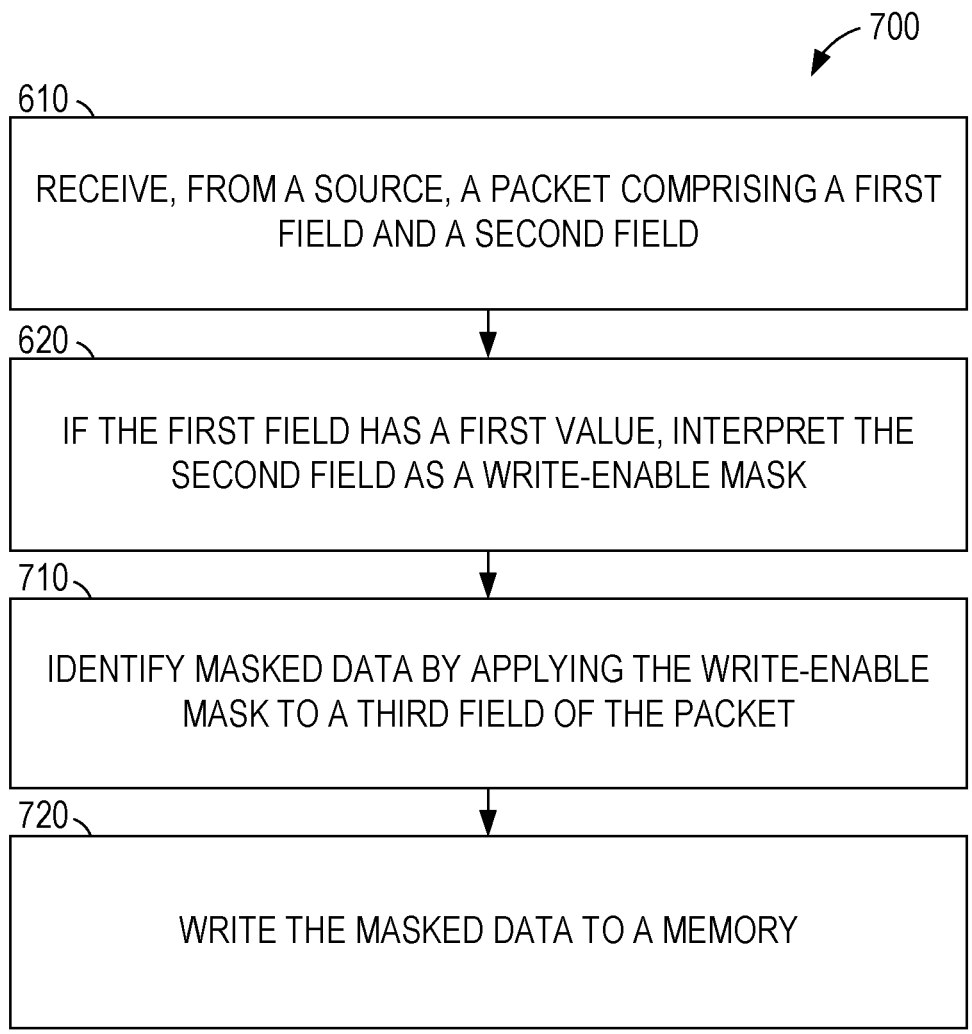
FIG. 7 is a flow chart showing operations of a method performed by a circuit in processing a data packet making use of a combined write enable mask and credit return field, in accordance with some embodiments of the present disclosure.

FIG. 7 is a flow chart showing operations of a method 700 performed by a circuit in processing a data packet making use of a combined write enable mask and credit return field, in accordance with some embodiments of the present disclosure. The method 700 includes operations 610 and 620 of the method 600 and operations 710 and 720. By way of example and not limitation, the method 700 is described as being performed by the devices of FIGS. 1-3, using the packets of FIGS. 4-5.

The method 700 is performed after receiving a packet in operation 610 and determining, in operation 620, to interpret the second field as a write-enable mask. In operation 710, the circuit identifies masked data by applying the write-enable mask to a third field of the packet. For example, the 32-bit data field 445 may be masked at the byte level using four bits of the CR/WEM field 440.

In operation 720, the circuit writes the masked data to a memory. For example, the masked data may be written to the off-die memory 375. Thus, by use of the method 700, masked data is written to a memory without requiring a dedicated write-enable mask field in the data packet 400.

Figure 8:
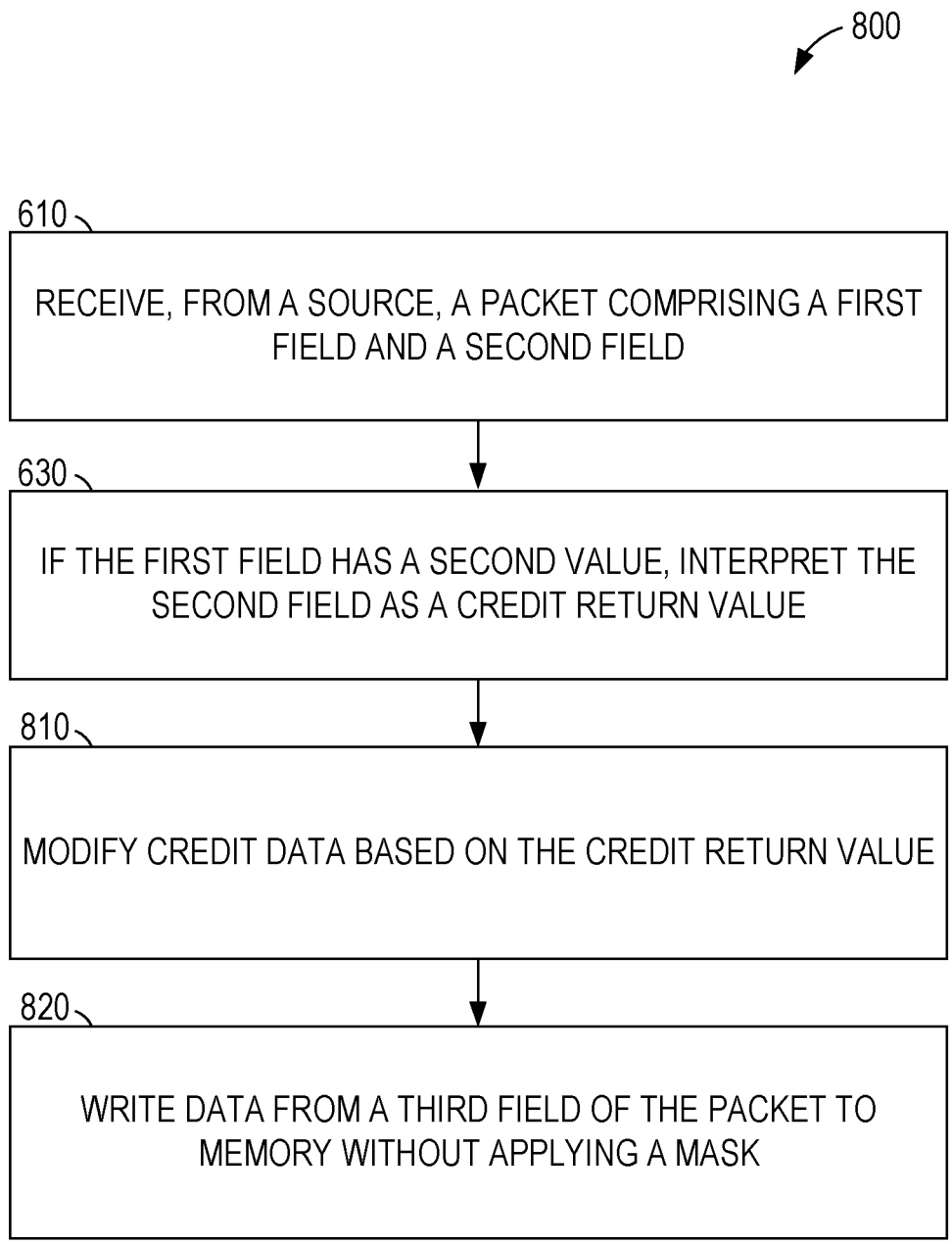
FIG. 8 is a flow chart showing operations of a method performed by a circuit in processing a data packet making use of a combined write enable mask and credit return field, in accordance with some embodiments of the present disclosure.

FIG. 8 is a flow chart showing operations of a method 800 performed by a circuit in processing a data packet making use of a combined write enable mask and credit return field, in accordance with some embodiments of the present disclosure. The method 800 includes operations 610 and 630 of the method 600 and operations 810 and 820. By way of example and not limitation, the method 800 is described as being performed by the devices of FIGS. 1-3, using the packets of FIGS. 4-5.

The method 800 is performed after receiving a packet in operation 610 and determining, in operation 630, to interpret the second field as a credit return field. In operation 810, the circuit modifies credit data (e.g., data representative of credits for a channel) based on the credit return value. The credit balance may be stored in a register file having one entry for each channel. For example, the four-bit CR/WEM field 440 indicates a value from 0-15 and the corresponding number of credits are added to the credit balance for the circuit that sent the data packet. In another example, the CR/WEM field 440 is treated as a credit return field only when at least one credit is being returned. Accordingly, the 4-bit value of the CR/WEM field 440 may be interpreted as a value from 1-16. In another example, the first two bits of the CR/WEM field 440 specify one of four virtual channels to replenish with credits at the sender and the second two bits specify the number of credits to return (0 to 3). In still other example embodiments, the CR/WEM field 440 is used to look up the number of credits returned in a look-up table, allowing arbitrary numbers of credits to be returned, so long as the sending and receiving circuits agree on the encoding used.

In operation 820, data from a third field of the packet is written to memory without applying a mask. For example, all 32 bits of the data field 445 may be written to the off-die memory 375, without applying a mask. Thus, by use of the method 800, credit return data is provided in the data packet 400 without requiring a dedicated credit return field.

Figure 9:
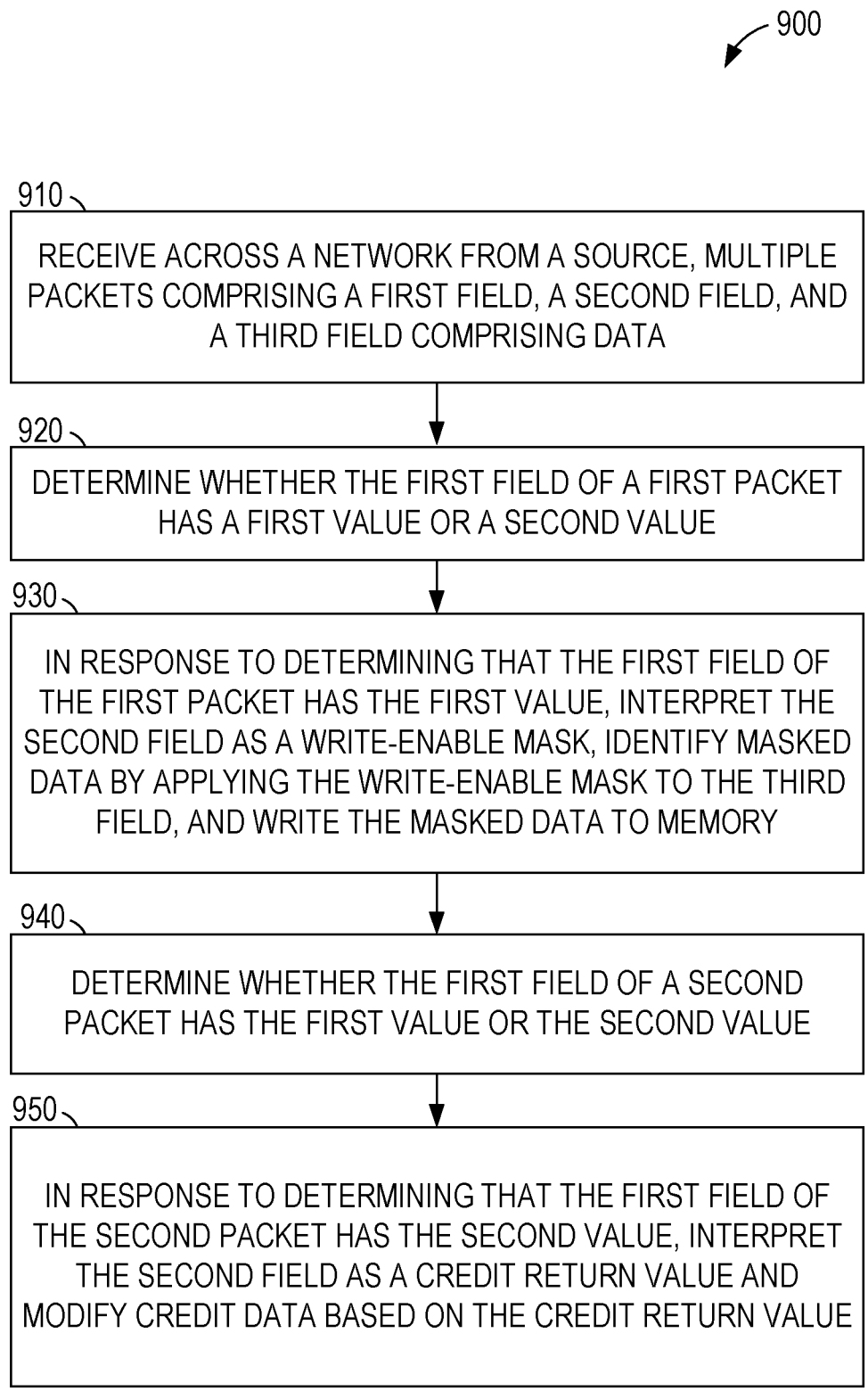
FIG. 9 is a flow chart showing operations of a method performed by a circuit in processing data packets making use of a combined write enable mask and credit return field, in accordance with some embodiments of the present disclosure.

FIG. 9 is a flow chart showing operations of a method 900 performed by a circuit in processing data packets making use of a combined write enable mask and credit return field, in accordance with some embodiments of the present disclosure. The method 900 includes operations 910, 920, 930, 940, and 950. By way of example and not limitation, the method 900 is described as being performed by the devices of FIGS. 1-3, using the packets of FIGS. 4-5.

In operation 910, a circuit (e.g., the chiplet 210D) receives, from a source (e.g., the chiplet 210A), multiple packets each comprising a first field, a second field, and a third field comprising data. In some example embodiments, each packet is of the form of the data packet 400, the first field is the CP field 405, the second field is the CR/WEM field 440, and the third field is the data field 445.

The circuit, in operation 920, determines whether the first field of a first packet has a first value or a second value. For example, the chiplet 210A may send a data packet 400 in which the CP field 405 includes a 1-bit field that indicates that whether CR/WEM field 440 is a WEM or a credit return value.

In response to determining that the first field of the first packet has the first value (e.g., the value of 2 or 3 that indicates that the CR/WEM field 440 is to be interpreted as a WEM), the circuit interprets the second field of the first packet as a WEM, identifies masked data by applying the WEM to the third field of the first packet, and writes the masked data to memory (operation 930).

In operation 940, the circuit determines whether the second field of a second packet as the first value or the second value. In response to determining, in operation 950, that the first field of the second packet has the second value, the circuit interprets the second field of the second packet as a credit return value and modifies credit data based on the credit return value. In some example embodiments, data from the third field of the second packet is written to memory without applying a mask.

Thus, by use of the method 900, a write enable mask is used by the first data packet and credit return data is provided in the second data packet without requiring a dedicated credit return field and using the same packet format for both data packets.

Figure 10:
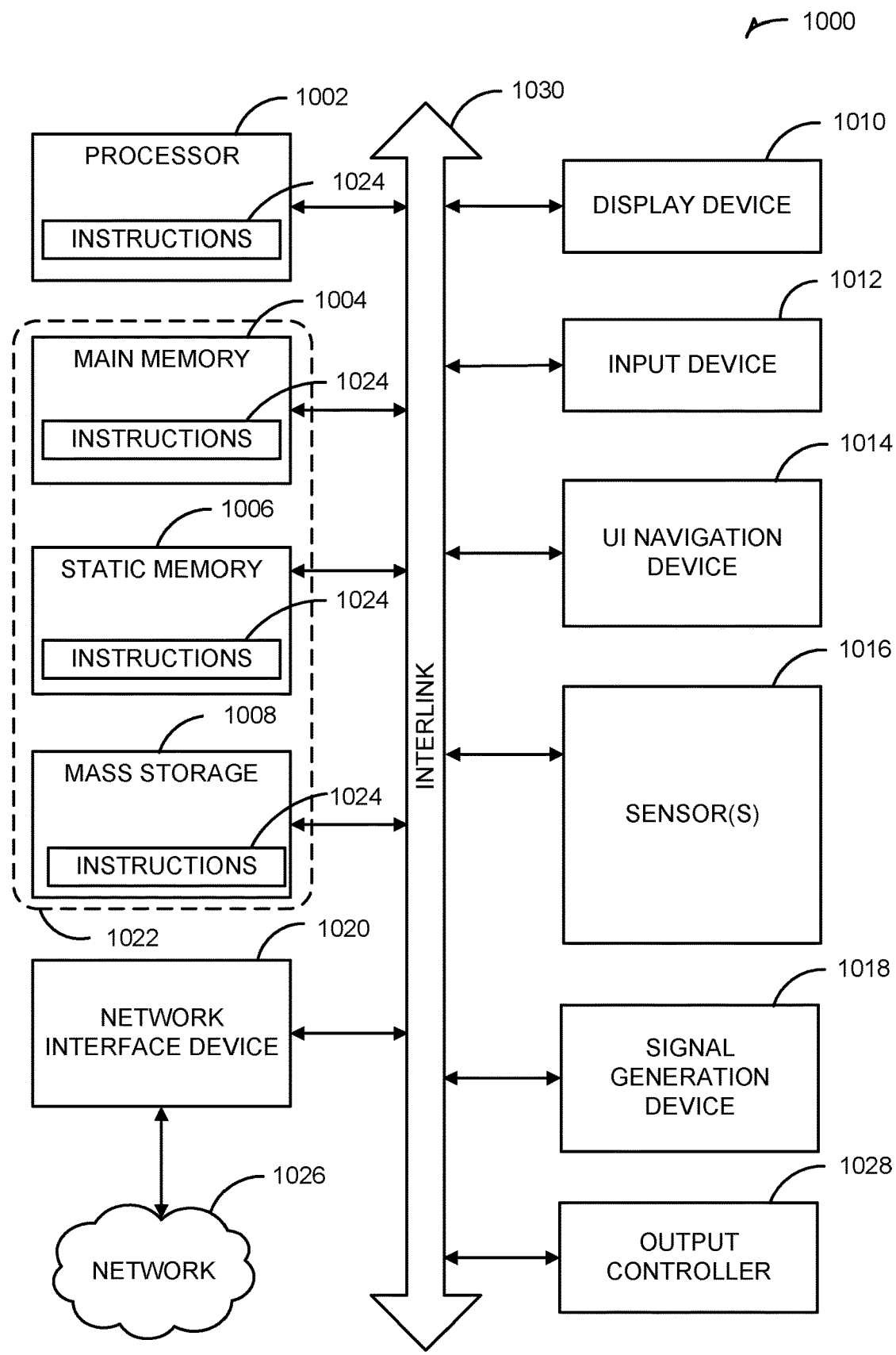
FIG. 10 is a block diagram of an example computer system in which embodiments of the present disclosure may operate.

FIG. 10 illustrates a block diagram of an example machine 1000 with which, in which, or by which any one or more of the techniques (e.g., methodologies) discussed herein can be implemented. Examples, as described herein, can include, or can operate by, logic or a number of components, or mechanisms in the machine 1000. Circuitry (e.g., processing circuitry) is a collection of circuits implemented in tangible entities of the machine 1000 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 1000 follow.

In alternative embodiments, the machine 1000 can operate as a standalone device or can be connected (e.g., networked) to other machines. In a networked deployment, the machine 1000 can operate in the capacity of a server machine, a client machine, or both in server-client network environments. In an example, the machine 1000 can act as a peer machine in peer-to-peer (P2P) (or other distributed) network environment. The machine 1000 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1000 can include a hardware processor 1002 (e.g., a central processing unit (CPU), a graphics processing unit (GPU), a hardware processor core, or any combination thereof), a main memory 1004, a static memory (e.g., memory or storage for firmware, microcode, a basic-input-output (BIOS), unified extensible firmware interface (UEFI), etc.) 1006, and mass storage 1008 (e.g., hard drives, tape drives, flash storage, or other block devices) some or all of which can communicate with each other via an interlink (e.g., bus) 1030. The machine 1000 can further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 can be a touch screen display. The machine 1000 can additionally include a storage device (e.g., drive unit) 1008, a signal generation device 1018 (e.g., a speaker), a network interface device 1020, and one or more sensors 1016, such as a global positioning system (GPS) sensor, compass, accelerometer, or other sensor. The machine 1000 can include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1002, the main memory 1004, the static memory 1006, or the mass storage 1008 can be, or include, a machine readable medium 1022 on which is stored one or more sets of data structures or instructions 1024 (e.g., software) embodying or utilized by any one or more of the techniques or functions described herein. The instructions 1024 can also reside, completely or at least partially, within any of registers of the processor 1002, the main memory 1004, the static memory 1006, or the mass storage 1008 during execution thereof by the machine 1000. In an example, one or any combination of the hardware processor 1002, the main memory 1004, the static memory 1006, or the mass storage 1008 can constitute the machine readable media 1022. While the machine readable medium 1022 is illustrated as a single medium, the term "machine readable medium" can include a single medium or multiple media (e.g., a centralized or distributed database, or associated caches and servers) configured to store the one or more instructions 1024.

The term "machine readable medium" can include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples can include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 1022 can be representative of the instructions 1024, such as instructions 1024 themselves or a format from which the instructions 1024 can be derived. This format from which the instructions 1024 can be derived can include source code, encoded instructions (e.g., in compressed or encrypted form), packaged instructions (e.g., split into multiple packages), or the like. The information representative of the instructions 1024 in the machine readable medium 1022 can be processed by processing circuitry into the instructions to implement any of the operations discussed herein. For example, deriving the instructions 1024 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 1024.

In an example, the derivation of the instructions 1024 can include assembly, compilation, or interpretation of the information (e.g., by the processing circuitry) to create the instructions 1024 from some intermediate or preprocessed format provided by the machine readable medium 1022. The information, when provided in multiple parts, can be combined, unpacked, and modified to create the instructions 1024. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 1024 can be further transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1020 can include one or more physical jacks (e.g., Ethernet, coaxial, or phone jacks) or one or more antennas to connect to the communications network 1026. In an example, the network interface device 1020 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software. A transmission medium is a machine readable medium.

In the foregoing specification, some example implementations of the disclosure have been described. It will be evident that various modifications can be made thereto without departing from the broader scope and spirit of the disclosure as set forth in the following claims. The specification and drawings are, accordingly, to be regarded in an illustrative sense rather than in a restrictive sense. Below is a non-exhaustive list of examples of implementations of the present disclosure.

Example 1 is a system comprising: a memory controller configured to execute instructions to perform operations, including: receiving across a network from a source, multiple packets comprising a first field, a second field, and a third field comprising data; determining whether the first field of a first packet has a first value or a second value; in response to determining that the first field of the first packet has the first value, interpreting the second field of the first packet as a write-enable mask, identifying masked data by applying the write-enable mask to the third field of the first packet, and writing the masked data to memory; determining whether the first field of a second packet has the first value or the second value; and in response to determining that the first field of the second packet has the second value, interpreting the second field of the second packet as a credit return value and modifying credit data based on the credit return value.

In Example 2, the subject matter of Example 1 includes, wherein the memory controller is on a first chiplet, and wherein the memory is on a second chiplet.

In Example 3, the subject matter of Examples 1-2 includes, wherein the memory controller is in communication with the memory through a double data rate (DDR) memory interface.

In Example 4, the subject matter of Examples 1-3 includes, wherein: the memory controller is on a first chiplet; the memory is on a second chiplet; and the memory controller is in communication with the memory chiplet through the network.

In Example 5, the subject matter of Examples 1-4 includes, wherein: the first field is a 2-bit field; and the second field is a 4-bit field.

In Example 6, the subject matter of Examples 1-5 includes, wherein: the first field is a 1-bit field; and the second field is a 4-bit field.

In Example 7, the subject matter of Examples 1-6 includes, wherein: the system further comprises a memory that stores data for each of a plurality of channels, the data for a channel representing credits for the channel; the packet further comprises a third field that identifies a channel of the plurality of channels; and the operations further comprise, if the first field has the second value: modifying the credit data for the identified channel based on the credit return value.

In Example 8, the subject matter of Examples 1-7 includes, wherein the operations further comprise: in response to determining that the first field of the second packet has the second value, writing the third field to the memory without applying a mask.

Example 9 is a non-transitory machine-readable medium that stores instructions that, when executed by a system, cause the system to perform operations comprising: receiving, by a memory controller, across a network from a source, multiple packets comprising a first field, a second field, and a third field comprising data; determining whether the first field of a first packet has a first value or a second value; in response to determining that the first field of the first packet has the first value, interpreting the second field of the first packet as a write-enable mask, identifying masked data by applying the write-enable mask to the third field of the first packet, and writing the masked data to memory; determining whether the first field of a second packet has the first value or the second value; and in response to determining that the first field of the second packet has the second value, interpreting the second field of the second packet as a credit return value and modifying credit data based on the credit return value.

In Example 10, the subject matter of Example 9 includes, wherein the memory controller is on a first chiplet, and wherein the memory is on a second chiplet.

In Example 11, the subject matter of Examples 9-10 includes, wherein the memory controller is in communication with the memory chiplet through a double data rate (DDR) memory interface.

In Example 12, the subject matter of Examples 9-11 includes, wherein: the memory controller is on a first chiplet; the memory is on a second chiplet; and the memory controller is in communication with the memory chiplet through the network.

In Example 13, the subject matter of Examples 9-12 includes, wherein: the first field is a 2-bit field; and the second field is a 4-bit field.

In Example 14, the subject matter of Examples 9-13 includes, wherein: the first field is a 1-bit field; and the second field is a 4-bit field.

In Example 15, the subject matter of Examples 9-14 includes, wherein: the system further comprises a memory that stores data for each of a plurality of channels, the data for a channel representing credits for the channel; the packet further comprises a third field that identifies a channel of the plurality of channels; and the operations further comprise, if the first field has the second value: modifying the credit data for the identified channel based on the credit return value.

Example 16 is a method comprising: receiving, by a memory controller, across a network from a source, multiple packets comprising a first field, a second field, and a third field comprising data; determining whether the first field of a first packet has a first value or a second value; in response to determining that the first field of the first packet has the first value, interpreting the second field of the first packet as a write-enable mask, identifying masked data by applying the write-enable mask to the third field of the first packet, and writing the masked data to memory; determining whether the first field of a second packet has the first value or the second value; and in response to determining that the first field of the second packet has the second value, interpreting the second field of the second packet as a credit return value and modifying credit data based on the credit return value.

In Example 17, the subject matter of Example 16 includes, wherein the memory controller is on a first chiplet, and wherein the memory is on a second chiplet.

In Example 18, the subject matter of Examples 16-17 includes, wherein the memory controller is in communication with the memory chiplet through a double data rate (DDR) memory interface.

In Example 19, the subject matter of Examples 16-18 includes, wherein: the memory controller is on a first chiplet; the memory is on a second chiplet; and the memory controller is in communication with the memory chiplet through the network.

In Example 20, the subject matter of Examples 16-19 includes, wherein: the first field is a 2-bit field; and the second field is a 4-bit field.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Example 25 is any of the memory devices of Examples 1-8 adapted and configured to perform operations in accordance with any of the methods of Examples 16-20.

Example 26 is any of the memory devices of Examples 1-8, incorporated into an electronic system further comprising a host processor and a communication bus extending between the host processor and the memory controller.

Example 27 is any of the memory devices of Examples 1-8 modified to include any structure presented in another of Examples 1-8.

Example 28 is an electronic system including a host processor and a communications interface extending between the host processor and a memory controller, configured to perform operations in accordance with any of the methods of Examples 16-20 or 24.

Example 29 is any of the methods of Examples 16-20 or 24, modified to include operations set forth in any other of Examples 16-20.

Example 30 is any of the methods of Examples 16-20, 24, or 29 implemented at least in part through use of instructions stored as a physical state in one or more machine-readable storage devices.

Example 31 is any of the apparatuses of Examples 1-8, 21-23, or 25-27, further including a machine-readable storage device configured to store instructions as a physical state, wherein the instructions may be used to perform one or more operations of the apparatus.

What is claimed is:
1. A system comprising:
a memory controller configured to execute instructions to perform operations, including:

receiving across a network from a source, a first packet comprising a first field, a second field, and a third field, the third field comprising first data;
determining whether the first field has a first value or a second value;
in response to determining that the first field has the first value, interpreting the second field as a write-enable mask, identifying masked data by applying the write-enable mask to the third field, and writing the masked data to memory; and
in response to determining that the first field has the second value, interpreting the second field as a credit return value and modifying credit data based on the credit return value.

2. The system of claim 1, wherein the memory controller is on a first chiplet, and wherein the memory is on a second chiplet.

3. The system of claim 1, wherein the memory controller is in communication with the memory through a double data rate (DDR) memory interface.

4. The system of claim 1, wherein:
the memory controller is on a first chiplet;
the memory is on a second chiplet; and
the first chiplet is in communication with the second chiplet through the network.

5. The system of claim 1, wherein:
the first field is a 2-bit field; and
the second field is a 4-bit field.

6. The system of claim 1, wherein:
the first field is a 1-bit field; and
the second field is a 4-bit field.

7. The system of claim 1, wherein:
the system further comprises a second memory that stores data for each of a plurality of channels, the data for each channel representing credits for the channel; and
the operations further comprise:
receiving across the network from the source, a second packet comprising a fourth field, a fifth field, and a sixth field that identifies a channel of the plurality of channels;
determining whether the fourth field has the first value or the second value; and
in response to determining that the fourth field has the second value:
interpreting the fifth field as a credit return value; and
modifying the data for the identified channel based on the credit return value.

8. The system of claim 1, wherein the operations further comprise:
receiving across the network from the source, a second packet comprising a fourth field and a fifth field;
in response to determining that the fourth field has the second value, writing the fifth field to the memory without applying a mask.

9. A non-transitory machine-readable medium that stores instructions that, when executed by a system, cause the system to perform operations comprising:
receiving, by a memory controller, across a network from a source, a first packet comprising a first field, a second field, and a third field, the third field comprising first data;
determining whether the first field has a first value or a second value;
in response to determining that the first field has the first value, interpreting the second field as a write-enable mask, identifying masked data by applying the write-enable mask to the third field, and writing the masked data to memory;
receiving, by the memory controller, across the network from the source, a second packet comprising a fourth field, a fifth field, and a sixth field, the sixth field that identifies a channel of a plurality of channels;
determining whether the fourth field has the first value or the second value; and
in response to determining that the fourth field has the second value, interpreting the fifth field as a credit return value and modifying credit data based on the credit return value.

10. The non-transitory machine-readable medium of claim 9, wherein the memory controller is on a first chiplet, and wherein the memory is on a second chiplet.

11. The non-transitory machine-readable medium of claim 9, wherein the memory controller is in communication with the memory through a double data rate (DDR) memory interface.

12. The non-transitory machine-readable medium of claim 9, wherein:
the memory controller is on a first chiplet;
the memory is on a second chiplet; and
the first chiplet is in communication with the second chiplet through the network.

13. The non-transitory machine-readable medium of claim 9, wherein:
the first field is a 2-bit field; and
the second field is a 4-bit field.

14. The non-transitory machine-readable medium of claim 9, wherein:
the first field is a 1-bit field; and
the second field is a 4-bit field.

15. The non-transitory machine-readable medium of claim 9, wherein:
the system further comprises a second memory that stores data for each of the plurality of channels, the data for each channel representing credits for the channel; and
the modifying of the credit data based on the credit return value comprises modifying the data in the second memory that represents the credits for the channel identified by the sixth field.

16. A method comprising:
receiving, by a memory controller, across a network from a source, a first packet comprising a first field, a second field, and a third field, the third field comprising first data;
based on determining whether the first field has a first value or a second value, selecting between a first response and a second, the first response comprising interpreting the second field as a write-enable mask, identifying masked data by applying the write-enable mask to the third field, and writing the masked data to memory, the second response comprising interpreting the second field as a credit return value and modifying credit data based on the credit return value; and
performing the selected response.

17. The method of claim 16, wherein the memory controller is on a first chiplet, and wherein the memory is on a second chiplet.

18. The method of claim 16, wherein the memory controller is in communication with the memory through a double data rate (DDR) memory interface.

19. The method of claim 16, wherein:
the memory controller is on a first chiplet;
the memory is on a second chiplet; and the first chiplet is in communication with the second chiplet through the network.

20. The method of claim 16, wherein:
the first field is a 2-bit field; and
the second field is a 4-bit field.

* * * * *